(12) United States Patent
Lantzman et al.

(10) Patent No.: US 12,495,046 B2
(45) Date of Patent: Dec. 9, 2025

(54) METHOD AND SYSTEM FOR CONTEXT-BASED ACCESS CONTROL OF NETWORK RESOURCES

(71) Applicant: JPMorgan Chase Bank, N.A., New York, NY (US)

(72) Inventors: Eyal Lantzman, Cambridge (GB); Jaroslaw Podgajny, Bromley (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 231 days.

(21) Appl. No.: 18/223,296

(22) Filed: Jul. 18, 2023

(65) Prior Publication Data

US 2025/0030698 A1    Jan. 23, 2025

(51) Int. Cl.
*H04L 9/40*    (2022.01)

(52) U.S. Cl.
CPC .......... *H04L 63/105* (2013.01); *H04L 63/102* (2013.01)

(58) Field of Classification Search
CPC ........................... H04L 63/105; H04L 63/102
See application file for complete search history.

(56) References Cited

U.S. PATENT DOCUMENTS 10,104,163 B1 * 10/2018 Stickle ................. H04L 63/102

* cited by examiner

*Primary Examiner* — El Hadji M Sall
(74) *Attorney, Agent, or Firm* — Greenblum & Bernstein, P.L.C.

(57) ABSTRACT

A system for context-based access control within a computer network that comprises existing virtual computing environments that exclude a first virtual computing environment. The system may comprise memory storing instructions that, when executed, cause a processor to: generate the first virtual computing environment within the computer network; sandbox the first virtual computing environment from each of the existing virtual computing environments; associate the first virtual computing environment with entitlements; provide, to network accounts, access to the first virtual computing environment; and access, by at least one of the network accounts, a network resource based on the access to the first virtual computing environment and according to at least one of the entitlements.

17 Claims, 4 Drawing Sheets

METHOD AND SYSTEM FOR CONTEXT-BASED ACCESS CONTROL OF NETWORK RESOURCES

BACKGROUND

1. Field of the Invention

The field of the invention disclosed herein generally relates to a solution for deficiencies in conventional computer network resource access control systems and, more particularly, to a method, system, and computer-readable storage medium for implementing computer network resource access control technology that cures deficiencies that exist within traditional access control paradigms.

2. Background of the Invention

Access to a network's resources has traditionally been controlled by assigning the entitlement(s) to such resources directly to the various users and agents of that network. Thereby, the network's users and agents may access resources according to entitlements that have been assigned to them directly. Due to its simplicity and straightforward implementation, one major advantage of this approach is that it typically does not call for processor intensive tasks. However, this approach also has drawbacks that make it less than ideal.

For example, under the traditional approach, the task of providing a group of individuals and/or agents with access to a network resource, requires that each individual and/or agent in that group be onboarded to that resource one at a time, even though all access may be provisioned simultaneously. However, such ineffective management of access results in a lot of friction and leans towards a most-privileged access control system.

In addition, deficiencies in the traditional approach may also manifest themselves through one or more loopholes. One such loophole that exists in the traditional approach occurs when a first user (and/or agent) has access to a first network resource to which a second user (and/or agent) does not have access, while the first and second users (and/or agents) both have access to a second network resource. Under these circumstances, a condition may arise where the first user saves data from the first resource to the second resource, which could then be accessed by the second user, although the second user should not actually have access to any data from the first resource.

Accordingly, there is a need in the field of the herein-disclosed invention for a technical solution to the foregoing limitations in the technology of existing approaches to controlling access to resources within a network.

SUMMARY

The present disclosure, through one or more of its various aspects, embodiments, and/or specific features or sub-component, provides, inter alia, various systems, servers, devices, methods, media, programs and platforms for implementing context-based network resource access control technology that cures deficiencies that exist within traditional access control paradigms. For example, not only does the technology disclosed herein enable a least-privileged on-demand provisioning of network resource access, but the herein-disclosed technology also enables approval and governance at a workspace level that combines resources and entitlements to permit more informed decisions. Furthermore, the technology of this disclosure improves entitlement governance by aligning the needs of a business with a workspace's entitlements, rather than directly aligning such business needs with entitlements of a user or agent of the technology.

According to an aspect of the present disclosure, a method is provided for context-based access control within a computer network that may comprise a set of virtual computing environments that excludes a first virtual computing environment. The method may comprise: generating the first virtual computing environment within the computer network; sandboxing the first virtual computing environment from each virtual computing environment among the set of virtual computing environments; associating the first virtual computing environment with a first set of entitlements; providing, to a first set of network accounts, access to the first virtual computing environment; and based on the access to the first virtual computing environment and according to at least one from among the first set of entitlements, accessing, by at least one network account from among the first set of network accounts, at least a first network resource.

The method may further comprise limiting a scope of the first virtual computing environment to a first context. A respective scope of each respective virtual computing environment may be limited to a respective context, and each respective virtual computing environment may be associated with a respective set of entitlements and may individually sandboxed from other virtual computing environments.

In the method, a context may comprise subject matter for which a corresponding virtual computer environment is permitted to be utilized.

In the method, each respective network account among the first set of network accounts may be associated with a respective subset of entitlements from among the first set of entitlements and, while a respective network account is logged into the first virtual computer environment, the respective network account may be prohibited from accessing an additional network resource according to a second entitlement that is not included among the respective subset of entitlements.

In the method, the respective network account may be associated with a respective role, and the respective subset of entitlements may comprise a minimum set of entitlements necessary for the respective network account to fulfill the respective role within a context of the first virtual computer environment.

In the method, an entitlement may comprise a permission to access a network resource of the computer network.

In the method, a network resource may comprise at least one from among a network storage resource, a network processing resource, a network input resource, and a network output resource.

In the method, a network account may be an account that is associated with a network identification number and one from among a network user and a network module.

In the method, the providing access to the first virtual computing environment may comprise: associating the first virtual computing environment with the first set of network accounts; and allowing the at least one network account to log into the first virtual computing environment.

In the method, each network account among the first set of network accounts may not be directly associated with an entitlement among the first set of entitlements, and each network account among the first set of network accounts may be incidentally associated with the first set of entitlements as a result of the access to the first virtual computer environment.

According to another aspect of the present disclosure, a system is provided for context-based access control within a computer network that may comprise a set of virtual computing environments that excludes a first virtual computing environment. The system may comprise a processor and memory that stores instructions that, when executed by the processor, cause the processor to perform operations. The operations may comprise: generating the first virtual computing environment within the computer network; sandboxing the first virtual computing environment from each virtual computing environment among the set of virtual computing environments; associating the first virtual computing environment with a first set of entitlements; providing, to a first set of network accounts, access to the first virtual computing environment; and accessing, by at least one network account from among the first set of network accounts, at least a first network resource based on the access to the first virtual computing environment and according to at least one from among the first set of entitlements.

In the system, when executed, the instructions may cause the processor to perform further operations comprising limiting a scope of the first virtual computing environment to a first context. A respective scope of each respective virtual computing environment may be limited to a respective context, and each respective virtual computing environment may be associated with a respective set of entitlements and may be individually sandboxed from other virtual computing environments.

In the system, when the instructions cause the processor to perform the operations, a context may comprise subject matter for which a corresponding virtual computer environment is permitted to be utilized.

In the system, when the instructions cause the processor to perform the operations, each respective network account among the first set of network accounts may be associated with a respective subset of entitlements from among the first set of entitlements and, while a respective network account is logged into the first virtual computer environment, the respective network account may be prohibited from accessing an additional network resource according to a second entitlement that is not included among the respective subset of entitlements.

In the system, when the instructions cause the processor to perform the operations, the respective network account may be associated with a respective role, and the respective subset of entitlements may comprise a minimum set of entitlements necessary for the respective network account to fulfill the respective role within a context of the first virtual computer environment.

In the system, when the instructions cause the processor to perform the operations, an entitlement may comprise a permission to access a network resource of the computer network.

In the system, a network resource may comprise at least one from among a network storage resource, a network processing resource, a network input resource, and a network output resource.

In the system, when the instructions cause the processor to perform the operations, a network account may be an account that is associated with a network identification number and one from among a network user and a network module.

In the system, when the instructions cause the processor to perform the operations, the providing access to the first virtual computing environment may comprise: associating the first virtual computing environment with the first set of network accounts; and allowing the at least one network account to log into the first virtual computing environment.

In the system, when the instructions cause the processor to perform the operations, each network account among the first set of network accounts may not be directly associated with an entitlement among the first set of entitlements, and each network account among the first set of network accounts may be incidentally associated with the first set of entitlements as a result of the access to the first virtual computer environment.

According to yet another aspect of the present disclosure, a non-transitory computer-readable medium is provided for context-based access control within a computer network that comprises a set of virtual computing environments that excludes a first virtual computing environment. The computer-readable medium may store instructions that, when executed by a processor, cause the processor to perform operations. The operations may comprise: generating the first virtual computing environment within the computer network; sandboxing the first virtual computing environment from each virtual computing environment among the set of virtual computing environments; associating the first virtual computing environment with a first set of entitlements; providing, to a first set of network accounts, access to the first virtual computing environment; and accessing, by at least one network account from among the first set of network accounts, at least a first network resource based on the access to the first virtual computing environment and according to at least one from among the first set of entitlements.

In the computer-readable medium, when executed, the instructions may cause the processor to perform further operations comprising limiting a scope of the first virtual computing environment to a first context. A respective scope of each respective virtual computing environment is limited to a respective context, and each respective virtual computing environment is associated with a respective set of entitlements and is individually sandboxed from other virtual computing environments.

In the computer-readable medium, when the instructions cause the processor to perform the operations, a context may comprise subject matter for which a corresponding virtual computer environment is permitted to be utilized.

In the computer-readable medium, when the instructions cause the processor to perform the operations, each respective network account among the first set of network accounts may be associated with a respective subset of entitlements from among the first set of entitlements and, while a respective network account is logged into the first virtual computer environment, the respective network account may be prohibited from accessing an additional network resource according to a second entitlement that is not included among the respective subset of entitlements.

In the computer-readable medium, when the instructions cause the processor to perform the operations, the respective network account may be associated with a respective role, and the respective subset of entitlements may comprise a minimum set of entitlements necessary for the respective network account to fulfill the respective role within a context of the first virtual computer environment.

In the computer-readable medium, when the instructions cause the processor to perform the operations, an entitlement may comprise a permission to access a network resource of the computer network.

In the computer-readable medium, a network resource may comprise at least one from among a network storage resource, a network processing resource, a network input resource, and a network output resource.

In the computer-readable medium, when the instructions cause the processor to perform the operations, a network account may be an account that is associated with a network identification number and one from among a network user and a network module.

In the computer-readable medium, when the instructions cause the processor to perform the operations, the providing access to the first virtual computing environment may comprise: associating the first virtual computing environment with the first set of network accounts; and allowing the at least one network account to log into the first virtual computing environment.

In the computer-readable medium, when the instructions cause the processor to perform the operations, each network account among the first set of network accounts may not be directly associated with an entitlement among the first set of entitlements, and each network account among the first set of network accounts may be incidentally associated with the first set of entitlements as a result of the access to the first virtual computer environment.

Thereby, the invention disclosed herein improves existing technology by providing a context-based solution for controlling access to resources within a computer network.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable storage media having instructions stored thereon for one or more aspects of the present technology as described and illustrated by way of the examples herein. In some examples, the instructions include executable code that, when executed by one or more processors, cause the processors to carry out steps necessary to implement the methods of the examples of this technology that are described and illustrated herein.

Figure 1:
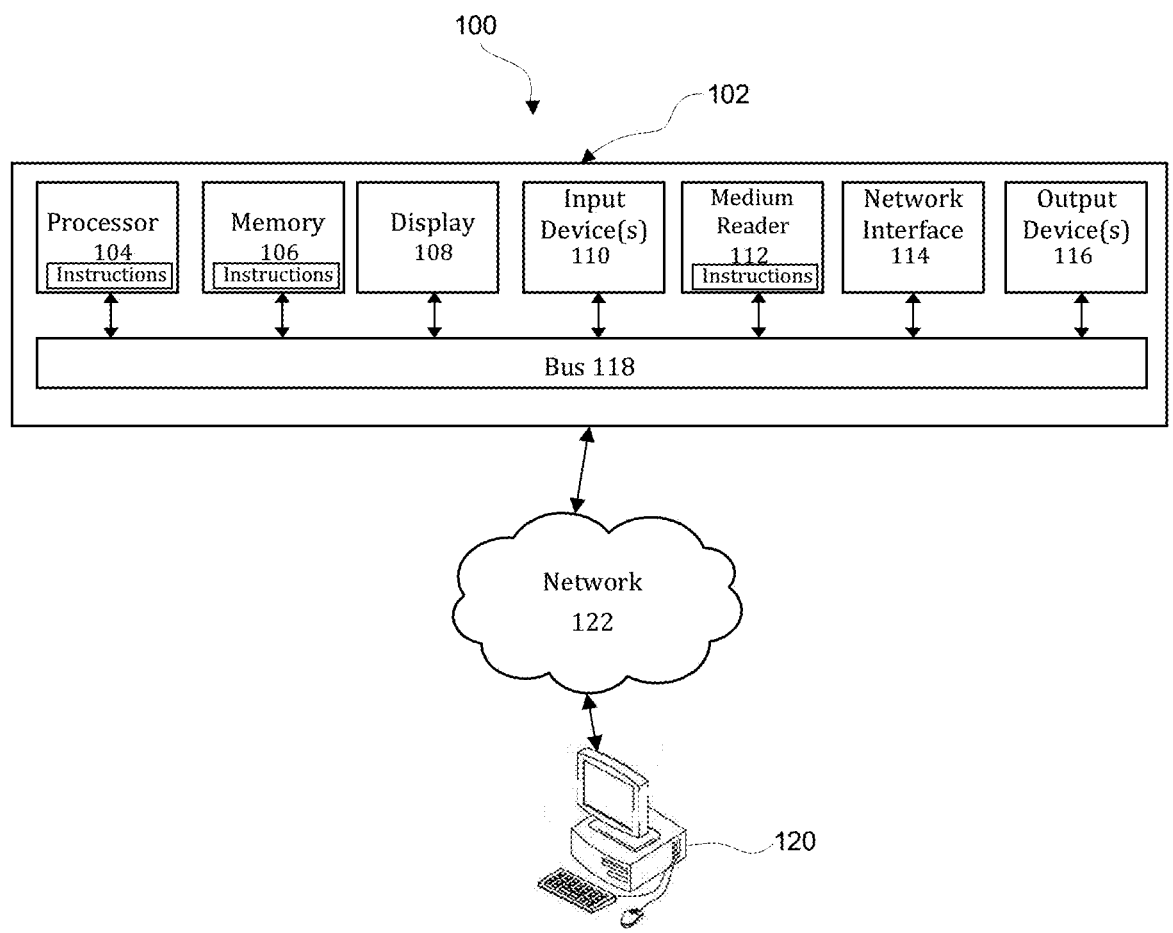
FIG. 1 is a diagram of an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide methods and systems for implementing a context-based access control tool that manages access to resources of a network.

Figure 2:
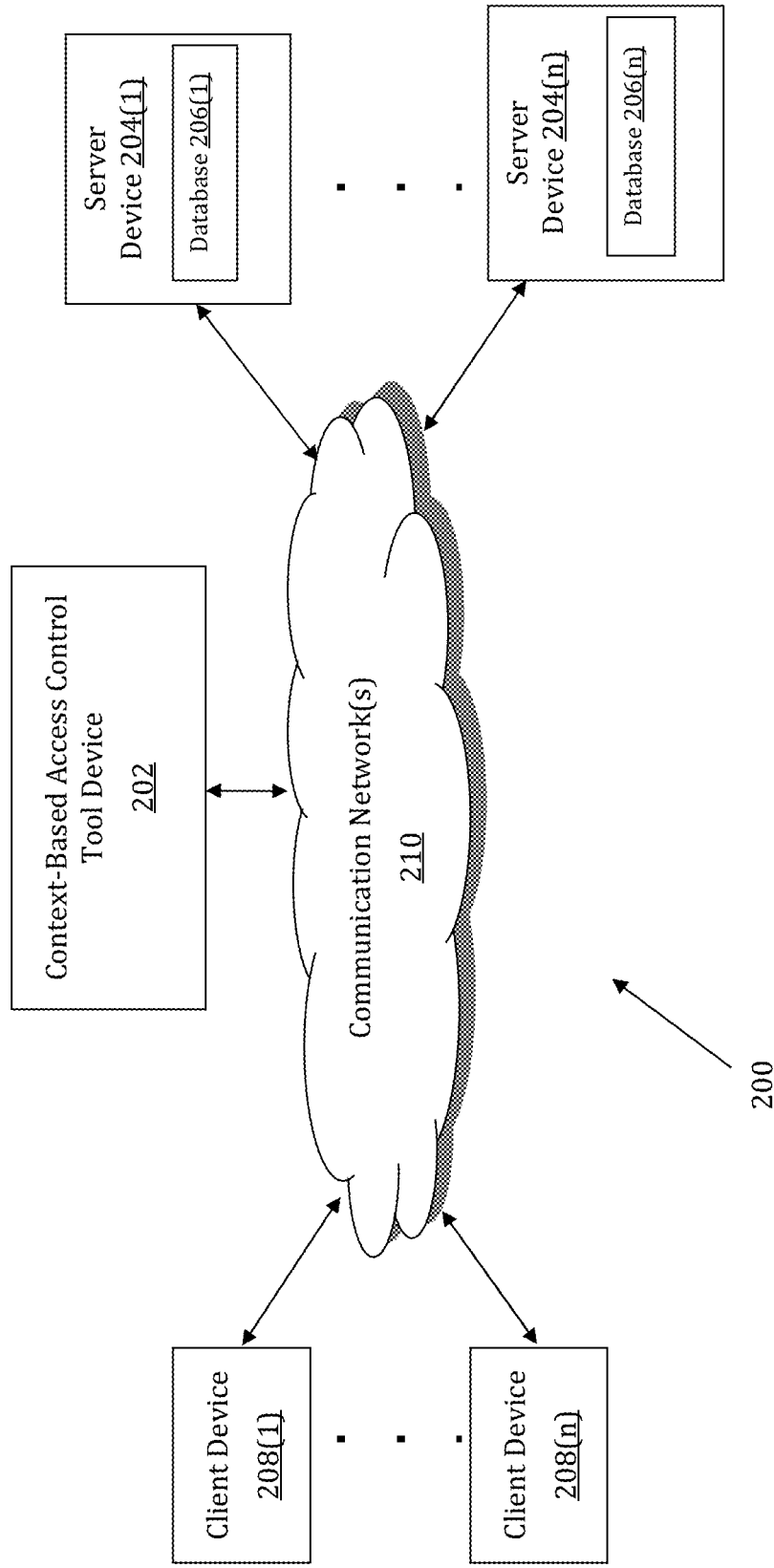
FIG. 2 is a diagram of an exemplary network environment for a context-based access control system that manages access to resources of a computer network.

Referring to FIG. 2, a schematic of an exemplary network environment 200 for a context-based access control tool that provides context-based management of access to resources in a network, is illustrated. In an exemplary embodiment, a context-based access control tool may be implemented on any networked computer platform, such as, for example, a personal computer (PC).

A method for implementing technology for context-based access control may be implemented by a Context-based Access Control Tool (CACT) device 202. The CACT device 202 may be the same or similar to the computer system 102 as described with respect to FIG. 1. The CACT device 202 may be a rack-mounted server in a datacenter, an embedded microcontroller (MCU) in an electronic device, or another type of headless system, which is a computer system or device that is configured to operate without a monitor, keyboard and mouse. The CACT device 202 may store one or more applications that can include executable instructions that, when executed by the CACT device 202, cause the CACT device 202 to perform actions, such as to transmit, receive, or otherwise process network communications, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CACT device 202 itself, may be located in virtual server(s) running in a cloud-based computing environment rather than being tied to one or more specific physical network computing devices. Also, the application(s) may be running in one or more virtual machines (VMs) executing on the CACT device 202. Additionally, in one or more embodiments of this technology, virtual machine(s) running on the CACT device 202 may be managed or supervised by a hypervisor.

In the network environment 200 of FIG. 2, the CACT device 202 is coupled to a plurality of server devices 204(1)-204(n) that hosts a plurality of databases 206(1)-206(n), and also to a plurality of client devices 208(1)-208(n) via communication network(s) 210. A communication interface of the CACT device 202, such as the network interface 114 of the computer system 102 of FIG. 1, operatively couples and communicates between the CACT device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CACT device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, computer readable media, and CACT devices that efficiently implement a method for a context-based access control tool that improves the overall speed, ease, and user experience of cyber defense capability assessment tasks.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CACT device 202 may be a standalone device or integrated with one or more other devices or apparatuses, such as one or more of the server devices 204(1)-204(n), for example. In one particular example, the CACT device 202 may include or be hosted by one of the server devices 204(1)-204(n), and other arrangements are also possible. As another example, the CACT device 202 may be integrated with one or more other devices or apparatuses, such as one or more of the client devices 208(1)-208(n). Moreover, one or more of the devices of the CACT device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CACT device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to a variety of databases.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the CACT device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the CACT device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the CACT device 202, the server devices 204(1)-204(n), the databases 206(1)-206(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CACT device 202, the server devices 204(1)-204(n), the databases 206(1)-206(n), or the client devices 208(1)-208(n), for example, may be configured to operate as virtual instances on the same physical machine. In other words, one or more of the CACT device 202, the server devices 204(1)-204(n), the databases 206(1)-206(n), or the client devices 208(1)-208(n) may operate on the same physical device rather than as separate devices communicating through communication network(s) 210. Additionally, there may be more or fewer CACT devices 202, server devices 204(1)-204(n), databases 206(1)-206(n), or client devices 208(1)-208(n) than illustrated in FIG. 2.

In addition, two or more computing systems, databases or devices may be substituted for any one of the systems, databases or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
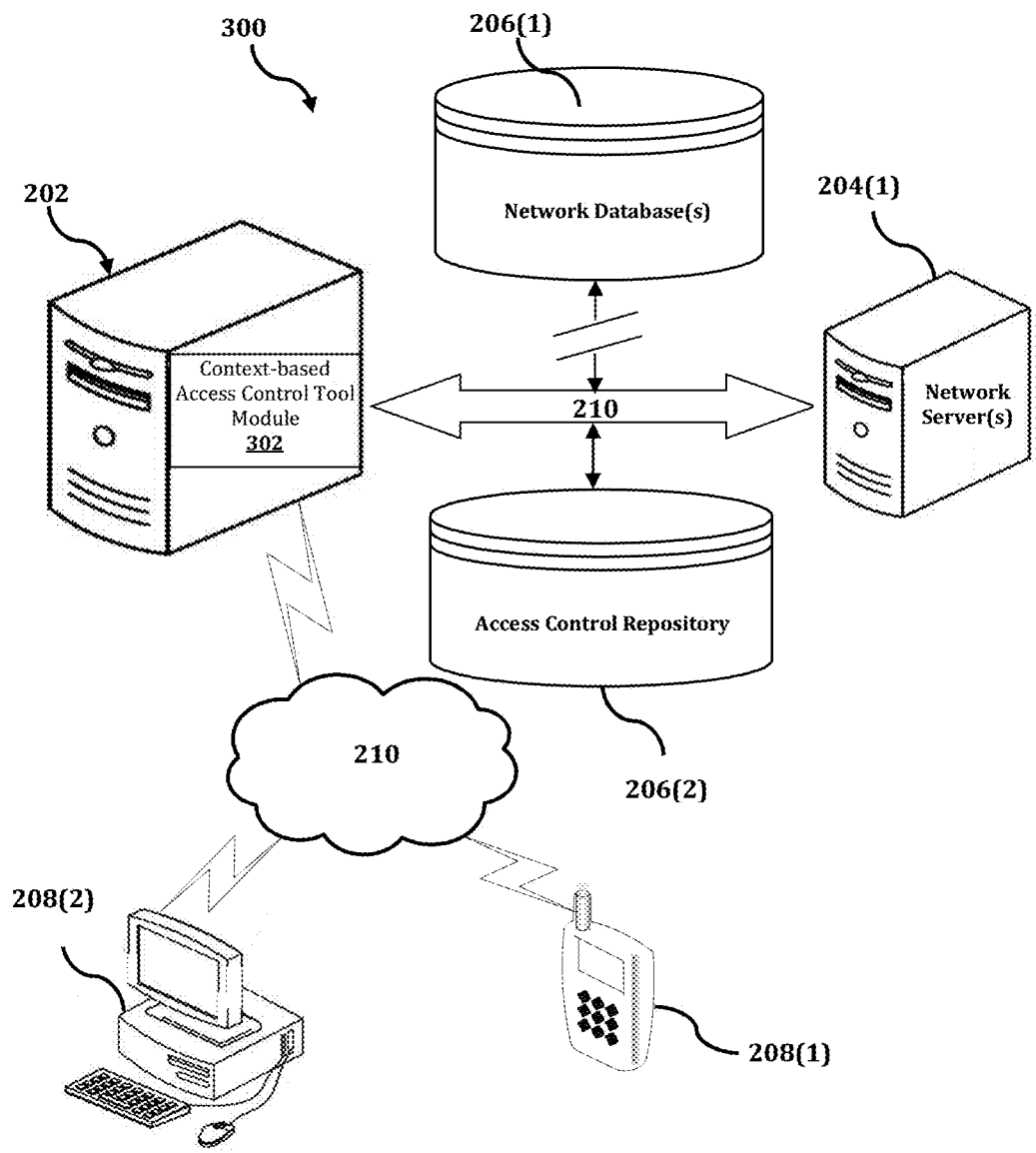
FIG. 3 is a diagram of an exemplary perspective of a network environment that utilizes a context-based access control system to manage access to resources of a computer network.

The CACT device 202 is described and illustrated in FIG. 3 as including context-based access control tool module 302, although it may include other rules, policies, modules, databases, or applications, for example. As will be described below, context-based access control tool module 302 is configured to provide context-based management of access to resources in a network. Context-based access control tool module 302 may include software that is based on a microservices architecture.

Context-based access control tool module 302 may be integrated with one or more devices or apparatuses, such as client devices 208(1)-208(n), where context-based access control tool module 302 may be implemented as an application or as an addon or plugin to another application of the one or more devices or apparatuses, and where context-based access control tool module 302 may execute in the background.

An exemplary process 300 for application of a context-based access control tool to an aspect of the network environment of FIG. 2 is illustrated as being executed in FIG. 3. Specifically, a first client device 208(1) and a second client device 208(2) are illustrated as being in communication with CACT device 202. In this regard, the first client device 208(1) and the second client device 208(2) may be "clients" of the CACT device 202 and are described herein as such. Nevertheless, it is to be known and understood that the first client device 208(1) and/or the second client device 208(2) need not necessarily be "clients" of the CACT device 202, or any entity described in association therewith herein. Any additional or alternative relationship may exist between either or both of first client device 208(1), second client device 208(2) and CACT device 202, or no relationship may exist.

Further, CACT device 202 is illustrated as being able to access network database(s) 206(1), and access control repository 206(2). CACT device 202 may comprise a context-based access control tool that communicates with network database(s) 206(1). In addition, the context-based access control tool of CACT device 202 may also communicate with access control repository 206(2). The context-based access control tool module 302 may be configured to access these databases in order to provide a context-based solution for controlling access to resources within a computer network.

Moreover, CACT device 202 may receive and transmit data via communication network(s) 210. CACT device 202 may receive and transmit data such as code that is written in one or more of the following dialects: transaction control language (TCL), data manipulation language (D-L), data control language (DCL) and data definition language (DFL). Additionally, via communication network(s) 210, CACT device 202 may respectively receive and transmit data from and to one or more of the following devices: network server(s) 204(1), network database(s) 206(1), access control repository 206(2), first client device 208(1), the second client device 208(2), and communication network(s) 210, for example.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The client devices 208(1)-208(n) may represent, for example, computer systems of an organization or database network. The first client device 208(1) represent, for example, one or more computer systems of a department or cluster within the organization or database network. Of course, the first client device 208(1) may include one or more of any of the devices described herein. The second client device 208(2) may be, for example, one or more computer systems of another department or cluster within the organization or database network. Of course, the second client device 208(2) may include one or more of any of the devices described herein.

The process may be executed via the communication network(s) 210, which may comprise plural networks as described above. For example, in an exemplary embodiment, either or both of the first client device 208(1) and the second client device 208(2) may communicate with the CACT device 202 via broadband or cellular communication. Of course, these embodiments are merely exemplary and are not limiting or exhaustive.

Context-based access control tool module 302 may execute a process for implementing a context-based access control tool that manages access to resources of a network. An exemplary process for implementing a context-based access control tool is generally indicated at flowchart 400 in FIG. 4.

Figure 4:
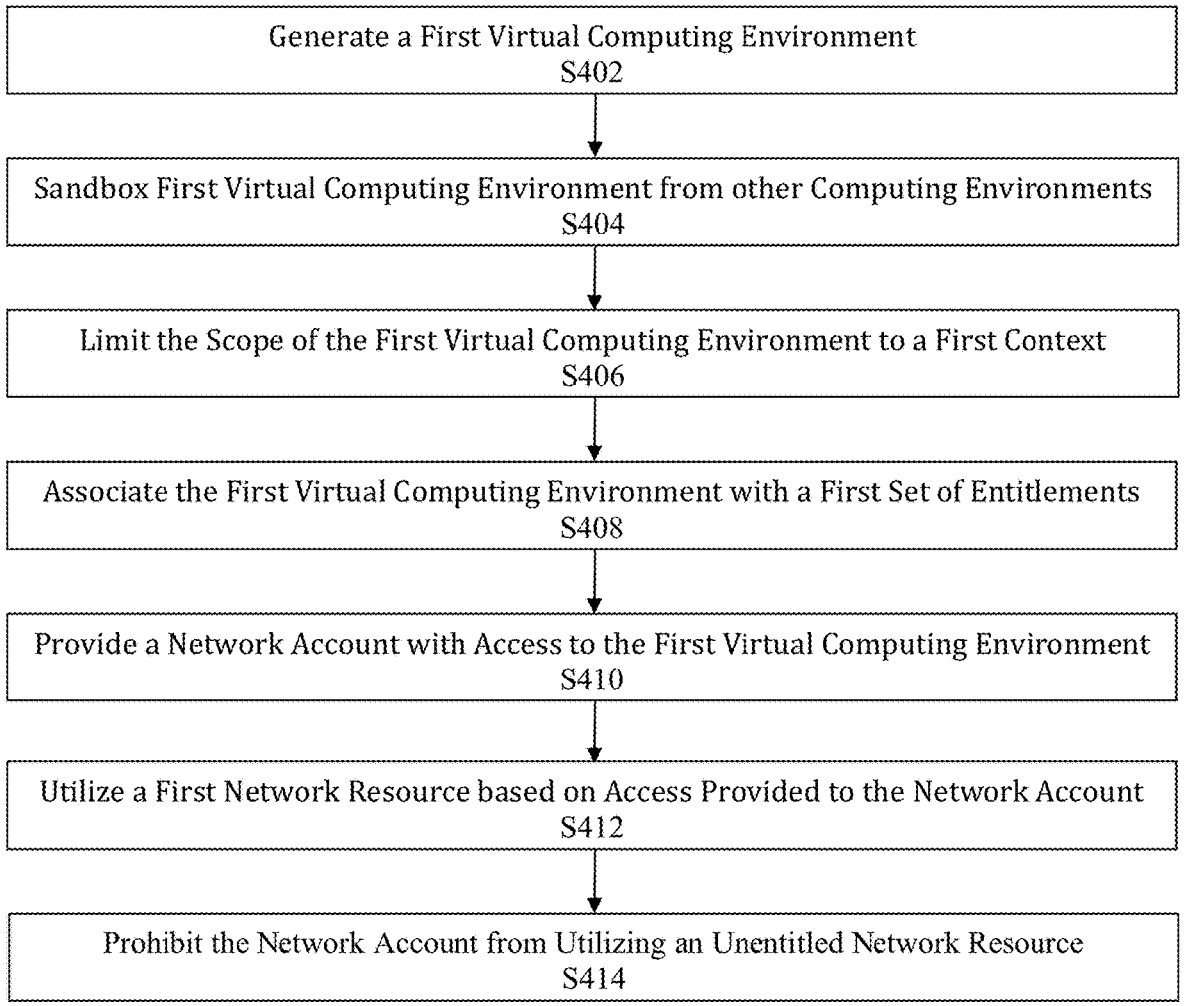
FIG. 4 is a flowchart of an exemplary process for context-based access control within a computer network.

In process 400 of FIG. 4, at step S402, context-based access control tool module 302 generates a first virtual computing environment, which may be any isolated executable software or hardware computing platform that may be represented virtually, such as a workspace. Context-based access control tool module 302 may generate the first virtual computing environment within either a new computer network or a computer network that already includes a pre-existing set of virtual computing environments. Each of the computer network's pre-existing virtual computing environments may be sandboxed from each of the network's other virtual computing environments, including (but not limited to) those in the pre-existing set.

At step S404, context-based access control tool module 302 utilizes a security tool that isolates software module platforms from one another (such as a trusted execution environment and/or a sandbox, etc.), to isolate (or "sandbox") the first virtual computing environment from every other virtual computing environment within its computer network, which may comprise any communication network, such as communication network(s) 210 (or, with respect to a trusted execution environment, bus 118).

At step S406, context-based access control tool module 302 limits the scope of the first virtual computing environment to a first context. Indeed, a respective scope of each respective virtual computing environment within a computer network may be limited to its own respective context (or any context for that matter). Within the scope of the present disclosure, the term "context" may refer to a subject matter for which—or the circumstance(s), setting(s) and/or event(s) under which—a virtual computing environment may be utilized (or logged into) by a network user and/or agent, such as client device 208. A network agent may refer to (but is not limited to) any software module on the network that has the agency to independently access a resource on the network.

At step S408, context-based access control tool module 302 associates the first virtual computing environment with a first set of entitlements. Indeed, each respective virtual computing environment within a computer network may be associated with its own respective set of entitlements (or set of entitlements for that matter). Within the scope of the present disclosure, the term "entitlement" may refer to one or more operations (e.g., read and/or write, etc.) that a holder of the entitlement (such as a network user and/or agent) is permitted to perform.

At step S410, context-based access control tool module 302 provides a first network account with access to the first virtual computing environment. Network accounts may be associated with one or more users and/or agents (e.g., client device(s) 208 of communication network(s) 210). Additionally, at step S410, in order to provide the first network account with access to the first virtual computing environment, context-based access control tool module 302 may associate the first virtual computing environment with a first set of network accounts that includes the first network account. Then, at step S410, context-based access control tool module 302 may subsequently allow at least the first network account to log into the first virtual computing environment. A network account may log into a virtual computing environment by utilizing a challenge prompt, a hardware token, biometric authentication, and/or access credentials (such as a password and/or temporary access code, etc.), for example.

After step S410, context-based access control tool module 302 may limit the scope of the first network account's entitlements to a least-privileged access, which limits the first set of entitlements that may be utilized by the first network account, to the fewest entitlements necessary for the first network account to fulfill its duties regarding the business need(s) aligned with the first virtual computing environment. Thereby, the entitlements that may be utilized by the first network account may be limited to a subset of the first set of entitlements.

The duties that a network account has with regard to business need(s) that are aligned with any particular virtual computing environment of the network account, may be based on a role of that network account. In other words, a network account may be associated with a role that is in turn associated with duties to be performed in furtherance of business needs of a computer network. Indeed, each network account that is provided with access to a virtual computing environment may be limited to its own respective subset of that virtual computing environment's entitlements (or any subset of those entitlements). It should also be noted that no network account may utilize an entitlement that is not associated with the virtual computing environment that such a network account is actually logged into and actively utilizing.

In an exemplary embodiment, the first network account (or another user, module and/or account) may request one or more additional entitlements that are excluded from the first subset of entitlements. In the embodiment, context-based access control tool module 302 (or an administrator) may respond to the request by granting the additional entitlements, denying the additional entitlements, or by granting one or more of the additional entitlements and denying the remaining one or more entitlements from among the additional entitlements. In a further embodiment, if such a response does grant any of the additional entitlements requested, then the granting of one or more of the additional entitlements that have been granted may be cascaded to one or more (including all) of the other network accounts among the first set of network accounts. In yet a further embodiment, the cascading of one or more grants of an additional entitlement may be based on the request further including a request for such cascading. In an embodiment, only a single request may be submitted for the first network account and/or the first subset of entitlements. In an alternative embodiment, the number of requests that may be submitted may actually be limited to any number of requests, or there may be no limit to the number of requests that may be submitted for the first network account and/or the first subset of entitlements.

At step S412, context-based access control tool module 302 enables the first network account to utilize at least a first network resource based on the access provided to the first network account at step S410 and, possibly, based on the above-mentioned subset of the first set of entitlements. For example, the first network account may be entitled to access the first resource based on such an entitlement's inclusion in either the subset of the first set of entitlements and/or the first set of entitlements. Thereby, the first network account may be provided with context-based access to one (or more) resources of a computer network. A network resource may include any hardware or software network component, such as (but not limited to) a network storage resource, a network processing resource, a network input resource, and/or a network output resource, etc.

At step S414, context-based access control tool module 302 prohibits the first network account to utilize at least a second network resource based on the access provided to the first network account at step S410 and, possibly, based on the above-mentioned subset of the first set of entitlements. For example, the first network account may not be entitled to access the second resource based on such an entitlement's exclusion from the first set of entitlements and/or the subset of the first set of entitlements. Thereby, context-based access control tool module 302 may eliminate any loopholes that may exist in its network resource access control system.

Thereby, according to the technology disclosed herein, no network account among a first set of network accounts (or no network account whatsoever) is directly associated with an entitlement (such as one of the first set of entitlements). Rather, every network account (e.g., each network account among the first set of network accounts) is merely incidentally associated with the first set of entitlements due to such an account's access to and active utilization of a virtual computer environment.

Accordingly, the present invention cures deficiencies that exist within traditional access control systems. For example, as mentioned above, not only does the technology disclosed herein enable a least-privileged on-demand provisioning of network resource access, but the herein-disclosed technology also enables approval and governance at a workspace level that combines resources and entitlements to permit more informed decisions. Furthermore, the technology of this disclosure improves entitlement governance by aligning the needs of a business with a workspace's entitlements, rather than directly aligning such business needs with entitlements of a user or agent of the technology.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for context-based access control within a computer network that comprises a set of virtual computing environments that excludes a first virtual computing environment, the method comprising:
   generating the first virtual computing environment within the computer network;
   sandboxing the first virtual computing environment from each virtual computing environment among the set of virtual computing environments;
   associating the first virtual computing environment with a first set of entitlements;
   providing, to a first set of network accounts, access to the first virtual computing environment; and
   based on the access to the first virtual computing environment and according to at least one from among the first set of entitlements, accessing, by at least one network account from among the first set of network accounts, at least a first network resource,
   wherein each respective network account among the first set of network accounts is associated with a respective subset of entitlements from among the first set of entitlements and
   wherein, while a respective network account is logged into the first virtual computer environment, the respective network account is prohibited from accessing an additional network resource according to a second entitlement that is not included among the respective subset of entitlements.

2. The method of claim 1, the method further comprising:
   limiting a scope of the first virtual computing environment to a first context,
   wherein a respective scope of each respective virtual computing environment is limited to a respective context, and
   wherein each respective virtual computing environment is associated with a respective set of entitlements and is individually sandboxed from other virtual computing environments.

3. The method of claim 1, wherein a context comprises subject matter for which a corresponding virtual computer environment is permitted to be utilized.

4. The method of claim 1, wherein:
   the respective network account is associated with a respective role, and
   the respective subset of entitlements comprises a minimum set of entitlements necessary for the respective network account to fulfill the respective role within a context of the first virtual computer environment.

5. The method of claim 1, wherein an entitlement comprises a permission to access a network resource of the computer network.

6. The method of claim 1, wherein a network resource comprises at least one from among a network storage resource, a network processing resource, a network input resource, and a network output resource.

7. The method of claim 1, wherein a network account is an account that is associated with a network identification number and one from among a network user and a network module.

8. The method of claim 1, wherein the providing access to the first virtual computing environment comprises:
   associating the first virtual computing environment with the first set of network accounts; and
   allowing the at least one network account to log into the first virtual computing environment.

9. The method of claim 1,
   wherein each network account among the first set of network accounts is not directly associated with an entitlement among the first set of entitlements, and
   wherein each network account among the first set of network accounts is incidentally associated with the first set of entitlements as a result of the access to the first virtual computer environment.

10. A system for context-based access control within a computer network that comprises a set of virtual computing environments that excludes a first virtual computing environment, the system comprising:
    a processor; and
    memory storing instructions that, when executed by the processor, cause the processor to perform operations comprising:
    generating the first virtual computing environment within the computer network;
    sandboxing the first virtual computing environment from each virtual computing environment among the set of virtual computing environments;
    associating the first virtual computing environment with a first set of entitlements;
    providing, to a first set of network accounts, access to the first virtual computing environment; and
    based on the access to the first virtual computing environment and according to at least one from among the first set of entitlements, accessing, by at least one network account from among the first set of network accounts, at least a first network resource,
    wherein each respective network account among the first set of network accounts is associated with a respective subset of entitlements from among the first set of entitlements and
    wherein, while a respective network account is logged into the first virtual computer environment, the respective network account is prohibited from accessing an additional network resource according to a second entitlement that is not included among the respective subset of entitlements.

11. The system of claim 10, wherein the instructions, when executed, cause the processor to perform further operations comprising:
    limiting a scope of the first virtual computing environment to a first context,
    wherein a respective scope of each respective virtual computing environment is limited to a respective context, and wherein each respective virtual computing environment is associated with a respective set of entitlements and is individually sandboxed from other virtual computing environments.

12. The system of claim 10, wherein:

the respective network account is associated with a respective role, and the respective subset of entitlements comprises a minimum set of entitlements necessary for the respective network account to fulfill the respective role within a context of the first virtual computer environment.

13. The system of claim 10, wherein the providing access to the first virtual computing environment comprises:

associating the first virtual computing environment with the first set of network accounts; and allowing the at least one network account to log into the first virtual computing environment.

14. The system of claim 10, wherein each network account among the first set of network accounts is not directly associated with an entitlement among the first set of entitlements, and wherein each network account among the first set of network accounts is incidentally associated with the first set of entitlements as a result of the access to the first virtual computer environment.

15. A non-transitory computer-readable medium for context-based access control within a computer network that comprises a set of virtual computing environments that excludes a first virtual computing environment, the computer-readable medium storing instructions that, when executed by a processor, cause the processor to perform operations comprising:

generating the first virtual computing environment within the computer network;

sandboxing the first virtual computing environment from each virtual computing environment among the set of virtual computing environments;

associating the first virtual computing environment with a first set of entitlements;

providing, to a first set of network accounts, access to the first virtual computing environment; and based on the access to the first virtual computing environment and according to at least one from among the first set of entitlements, accessing, by at least one network account from among the first set of network accounts, at least a first network resource, wherein each respective network account among the first set of network accounts is associated with a respective subset of entitlements from among the first set of entitlements and wherein, while a respective network account is logged into the first virtual computer environment, the respective network account is prohibited from accessing an additional network resource according to a second entitlement that is not included among the respective subset of entitlements.

16. The computer-readable medium of claim 15, wherein the instructions, when executed, cause the processor to perform further operations comprising:

limiting a scope of the first virtual computing environment to a first context, wherein a respective scope of each respective virtual computing environment is limited to a respective context, and wherein each respective virtual computing environment is associated with a respective set of entitlements and is individually sandboxed from other virtual computing environments.

17. The computer-readable medium of claim 15, wherein:

the respective network account is associated with a respective role, and the respective subset of entitlements comprises a minimum set of entitlements necessary for the respective network account to fulfill the respective role within a context of the first virtual computer environment.

\* \* \* \* \*